United States Patent
Smith et al.

(10) Patent No.: US 9,943,719 B2
(45) Date of Patent: Apr. 17, 2018

(54) WEIGHT SELECTOR RELEASE MECHANISM

(71) Applicant: ICON Health & Fitness, Inc., Logan, UT (US)

(72) Inventors: Kent M. Smith, Nibley, UT (US); William T. Dalebout, North Logan, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 57 days.

(21) Appl. No.: 14/838,074

(22) Filed: Aug. 27, 2015

(65) Prior Publication Data

US 2016/0059064 A1    Mar. 3, 2016

Related U.S. Application Data

(60) Provisional application No. 62/043,240, filed on Aug. 28, 2014.

(51) Int. Cl.
*A63B 21/072* (2006.01)
*A63B 21/075* (2006.01)
(Continued)

(52) U.S. Cl.
CPC ........ *A63B 21/0728* (2013.01); *A63B 21/075* (2013.01); *A63B 21/0726* (2013.01);
(Continued)

(58) Field of Classification Search
CPC ............ A63B 24/0062; A63B 24/0087; A63B 21/0726; A63B 71/0054; A63B 23/03541; A63B 71/0036; A63B 2225/20; A63B 2220/17; A63B 2071/0683; A63B 2024/0093; A63B 21/0058; A63B 21/00065; A63B 21/0728; A63B 21/075;
(Continued)

(56) References Cited

U.S. PATENT DOCUMENTS 6,261,022 B1    7/2001   Dalebout et al.
6,416,446 B1 *  7/2002   Krull ................. A63B 21/0628
                                                     482/107

(Continued)

FOREIGN PATENT DOCUMENTS

CN    101171055    7/2010
TW    M359339      6/2009
(Continued)

OTHER PUBLICATIONS

Taiwan Patent Application No. 104128464 office action dated May 20, 2016 with search report.
(Continued)

*Primary Examiner* — Joshua Lee
(74) *Attorney, Agent, or Firm* — Holland & Hart PC

(57) ABSTRACT

A dumbbell assembly includes a cradle. The cradle includes a body, a trough defined in the body and sized to receive a weight of an adjustable dumbbell, an input mechanism incorporated into the body, and a selection mechanism incorporated into the body. The selection mechanism includes a selector that adjusts a connection of the weight with the adjustable dumbbell in response to a command received from the input mechanism.

16 Claims, 11 Drawing Sheets

(51) Int. Cl.
*A63B 24/00* (2006.01)
*G06Q 10/06* (2012.01)
*A63B 71/06* (2006.01)
*A63B 71/00* (2006.01)
*A63B 21/005* (2006.01)
*A63B 21/02* (2006.01)
*H04M 1/725* (2006.01)
*A63B 23/035* (2006.01)

(52) U.S. Cl.
CPC ...... *A63B 24/0062* (2013.01); *A63B 24/0087* (2013.01); *G06Q 10/0639* (2013.01); *A63B 21/0058* (2013.01); *A63B 21/023* (2013.01); *A63B 23/03541* (2013.01); *A63B 71/0036* (2013.01); *A63B 71/0054* (2013.01); *A63B 2024/0068* (2013.01); *A63B 2024/0093* (2013.01); *A63B 2071/063* (2013.01); *A63B 2071/065* (2013.01); *A63B 2071/068* (2013.01); *A63B 2071/0683* (2013.01); *A63B 2220/17* (2013.01); *A63B 2220/30* (2013.01); *A63B 2225/20* (2013.01); *A63B 2225/50* (2013.01); *A63B 2230/06* (2013.01); *A63B 2230/30* (2013.01); *A63B 2230/40* (2013.01); *A63B 2230/50* (2013.01); *A63B 2230/60* (2013.01); *A63B 2230/75* (2013.01); *H04M 1/72522* (2013.01)

(58) Field of Classification Search
CPC .......... A63B 21/023; A63B 2024/0068; A63B 2230/50; A63B 2230/60; A63B 2225/50; A63B 2230/75; A63B 2230/40; A63B 2230/06; A63B 2220/30; A63B 2071/068; A63B 2071/065; A63B 2071/063; A63B 2230/30; G06Q 10/0639; H04M 1/72522
See application file for complete search history.

(56) References Cited

U.S. PATENT DOCUMENTS

| | | | |
|---|---|---|---|
| 6,500,101 B1 | 12/2002 | Chen | |
| 7,172,536 B2 | 2/2007 | Liu | |
| 7,223,214 B2 | 5/2007 | Chen | |
| 7,291,098 B1 * | 11/2007 | Krull | A63B 71/0036 482/107 |
| 7,413,533 B2 | 8/2008 | Lin | |
| 7,485,077 B2 * | 2/2009 | Chen | A63B 21/0728 482/106 |
| 7,520,845 B2 * | 4/2009 | Towley, III | A63B 21/0726 482/106 |
| 7,604,578 B2 | 10/2009 | Liu | |
| 7,794,373 B2 * | 9/2010 | Crawford | A63B 21/0607 482/107 |
| 7,980,996 B2 | 7/2011 | Hickman | |
| 8,002,680 B2 | 8/2011 | Crawford et al. | |
| 8,007,415 B1 | 8/2011 | Lundquist | |
| 8,025,613 B1 | 9/2011 | Wang | |
| 8,298,125 B2 | 10/2012 | Colledge et al. | |
| 2003/0148862 A1 | 8/2003 | Chen et al. | |
| 2004/0005968 A1 | 1/2004 | Crawford et al. | |
| 2009/0124470 A1 * | 5/2009 | Yu | A63B 21/063 482/107 |
| 2009/0186748 A1 | 7/2009 | Golesh et al. | |
| 2010/0184570 A1 * | 7/2010 | Cheng | A63B 21/075 482/107 |
| 2010/0190618 A1 * | 7/2010 | Chen | A63B 21/075 482/108 |
| 2010/0304940 A1 * | 12/2010 | Svenberg | A63B 21/075 482/108 |
| 2012/0115689 A1 * | 5/2012 | Dalebout | A63B 21/0726 482/107 |
| 2014/0349820 A1 * | 11/2014 | Wang | A63B 21/075 482/108 |
| 2015/0360073 A1 * | 12/2015 | Moran | A63B 21/075 482/107 |

FOREIGN PATENT DOCUMENTS

| | | |
|---|---|---|
| TW | 1339127 | 3/2011 |
| WO | 9417862 | 8/1995 |

OTHER PUBLICATIONS

International Search Report Issued in PCT/US2015/047273 dated Oct. 20, 2015.

* cited by examiner

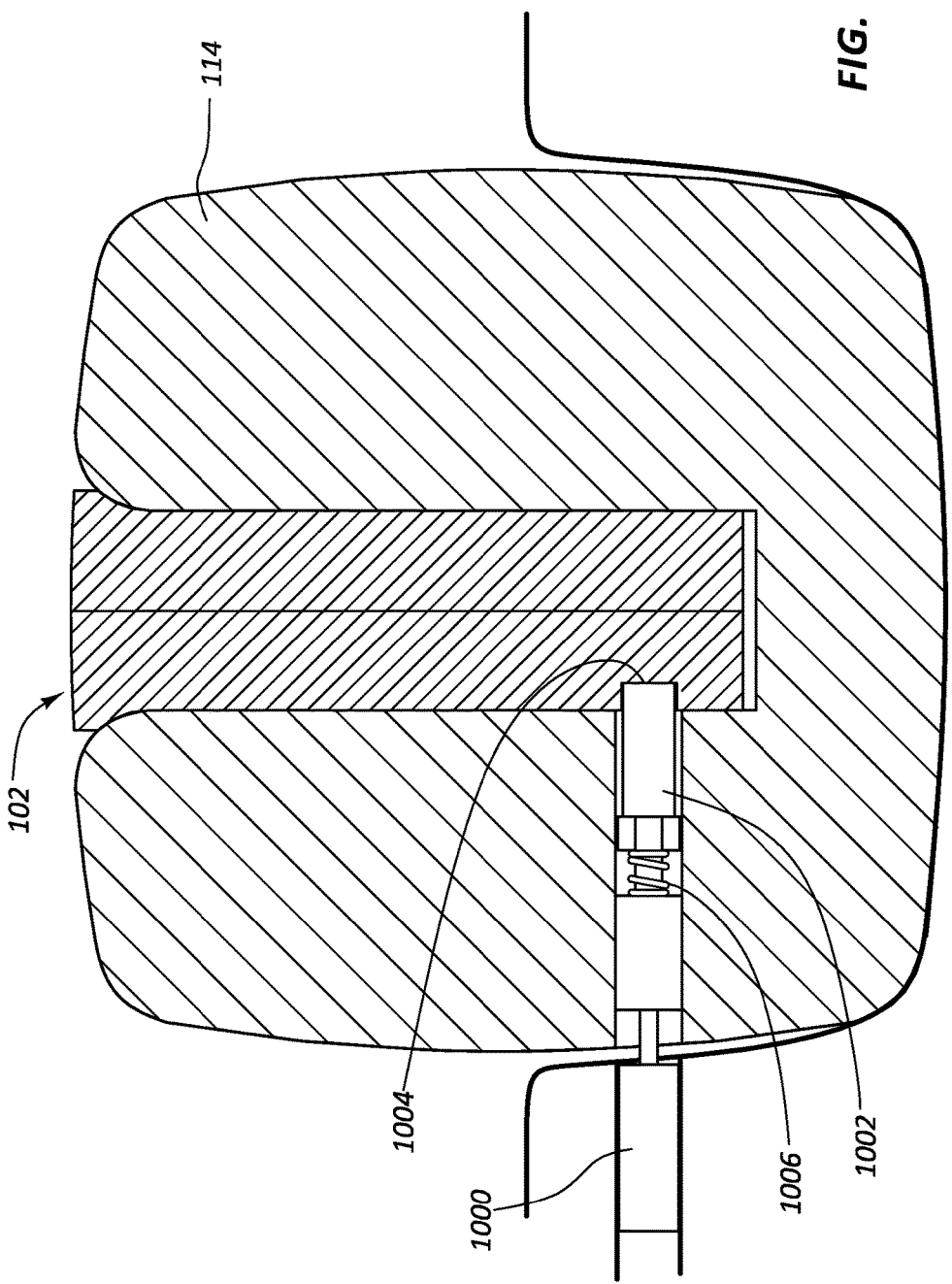

WEIGHT SELECTOR RELEASE MECHANISM

RELATED APPLICATIONS

This application claims priority to U.S. patent application Ser. No. 62/043,240 titled "Weight Selector Release Mechanism" and filed on 28 Aug. 2014, which application is herein incorporated by reference for all that it discloses.

BACKGROUND

While there are numerous exercise activities that one may participate in, exercise may be broadly broken into the categories of aerobic exercise and anaerobic exercise. Aerobic exercise generally refers to activities that substantially increase the heart rate and respiration of the exerciser for an extended period of time. This type of exercise is generally directed to enhancing cardiovascular performance. This exercise usually includes low or moderate resistance to the movement of the individual. For example, aerobic exercise includes activities such as walking, running, jogging, swimming or bicycling for extended distances and extended periods of time.

Anaerobic exercise generally refers to exercise that strengthens skeletal muscles and usually involves the flexing or contraction of targeted muscles through significant exertion during a relatively short period of time and/or through a relatively small number of repetitions. For example, anaerobic exercise includes activities such as weight training, push-ups, sit-ups, pull-ups, or a series of short sprints.

To build skeletal muscle, a muscle group is contracted against resistance. The contraction of some muscle groups produces a pushing motion, while the contraction of other muscle groups produces a pulling motion. One type of exercise device that provides resistance to user's muscle contraction is a dumbbell. A dumbbell often includes a handle and weights at either end of the handle. In some cases, the weights are permanently affixed to the handle. Other types of dumbbells are adjustable where the weights can be removed and/or added to allow the user to adjust the amount of weight on the dumbbell.

One type of dumbbell is disclosed in U.S. Pat. No. 7,172,536 issued to Wei Ming Liu. In this reference, an adjustable dumbbell includes a number of weights, each having a slot to receive end portions of a bar, and a number of latch rods slidably engaged in the weights and each having an inner end engageable into the slots of the weights and engageable with the bar, to anchor and latch a selected number of the weights to the bar, and to allow the selected weights to be moved in concert with the bar. The weights each have a spring member to bias and force the inner end of the latch rod to engage with and to latch the weights to the bar. The weights each include a panel having an orifice to slidably receive the latch rod, and to anchor the latch rod to the panel when the catch of the knob is rotated relative to the panel. Other types of dumbbells are described in U.S. Pat. No. 6,500,101 issued to James Chen, U.S. Patent Publication No. 2004/0005968 issued to Douglas A. Crawford, et al., U.S. Patent Publication No. 2012/0115689 issued to William Dalebout, et al., and WIPO International Publication No. WO/1994/017862 issued to Carl K. Towley. Each of these documents are herein incorporated by reference for all that they contain.

SUMMARY

In one embodiment, a dumbbell assembly includes a cradle. The cradle includes a body, a trough defined in the body and sized to receive a weight of an adjustable dumbbell, an input mechanism incorporated into the body, and a selection mechanism incorporated into the body. The selection mechanism includes a selector that adjusts a connection of the weight with the adjustable dumbbell in response to a command received from the input mechanism.

The weight may include an underside, a cradle opening is defined in the underside, and a cavity is defined within the weight and in communication with the cradle opening. The selector protrudes into the cavity when the weight is received by the trough.

The selector may include a linear actuator to change a distance that the selector protrudes into the cavity.

The adjustable dumbbell may include a support structure and a connection feature. The selector may include a first linear position. The selector may cause a distal end of the selector to engage the connection feature disconnecting the weight from the support structure of the adjustable dumbbell when the selector is in the first linear position.

The distal end of the selector may be shaped to move the connection feature when the selector is engaged with the connection feature.

The cavity may include a structure opening positioned to receive a connection feature of a support structure.

The cavity may include a neck proximate the structure opening that includes a catch positioned to interlock with the selection mechanism.

The adjustable dumbbell may include a support structure to which the weight connects, and the adjustable dumbbell may include an underside and a connection feature incorporated into the underside.

The weight may include a cavity, and the connection feature may be exposed within the cavity when the weight is received within the trough.

The connection feature may include a hook that locks the weight to the support structure of the adjustable dumbbell when the hook is in an interlocking position.

The connection feature may be positioned to release the weight from the support structure when at least a portion of the connection feature is moved in a release direction to a release position by the selector incorporated in the cradle.

In one embodiment, a cradle includes a body, a trough defined in the body and sized to receive a weight of an adjustable dumbbell, a selection mechanism incorporated into the body, an input mechanism in communication with the selection mechanism, and the selection mechanism including a selector that adjusts a connection of the weight.

A cavity may be defined in the weight, and the selector may include a rod that protrudes into the cavity when the adjustable dumbbell is docked in the cradle.

The selector may include a linear actuator that changes a distance that the selector protrudes into the cavity in response to a command from the input mechanism.

The adjustable dumbbell may include a support structure and a connection feature. The selector may include a first linear position, and the selector causes a distal end of the selector to engage the connection feature disconnecting the weight from the support structure of the adjustable dumbbell when the selector is in the first linear position.

The distal end of the selector may be shaped to move the connection feature when the selector is engaged with the connection feature.

The cradle may include a second trough to receive a second weight connected to a second adjustable dumbbell, and a second selector to adjust a second connection of the second weight.

In one embodiment, a weight for attachment to a support structure of an adjustable dumbbell includes a body, and a cavity in the body for receiving a selector of the cradle that is capable of connecting or disconnecting the weight to the adjustable dumbbell.

The weight may include a cradle side that resides in a trough of a cradle when the weight is received into the trough, a connection side that connects to the support structure of the adjustable dumbbell, the connection side including a slot shaped to receive the support structure, and the cavity extending from a structure opening defined in a base of the slot and a cradle opening defined in the cradle side.

The cavity may include a neck proximate the structure opening, and the cavity may further include a catch positioned to interlock with a connection feature of the support structure.

BRIEF DESCRIPTION OF THE DRAWINGS

The accompanying drawings illustrate various embodiments of the present apparatus and are a part of the specification. The illustrated embodiments are merely examples of the present apparatus and do not limit the scope thereof.

FIG. 10 illustrates a cross sectional view of an example of a dumbbell and weights connected to an example of a cradle in accordance with the present disclosure.

Throughout the drawings, identical reference numbers designate similar, but not necessarily identical, elements.

DETAILED DESCRIPTION

Often users desire to change the amount of weight that is secured to a dumbbell as they switch between different types of exercises. Changing the amount of weight by hand can be time consuming, especially when multiple types of exercises involving different weight amounts are incorporated into a single workout session.

The principles described in the present disclosure include a dumbbell assembly having a cradle shaped to receive at least one dumbbell. An input mechanism is in communication with a selection mechanism incorporated into the cradle where the selection mechanism is in communication with at least one selector to adjust a connection of the weight set to the dumbbell.

For purposes of this disclosure, the term "aligned" means parallel, substantially parallel, or forming an angle of less than 35 degrees. For purposes of this disclosure, the term "transverse" means perpendicular, substantially perpendicular, or forming an angle between 55 and 125 degrees.

Figure 1A:
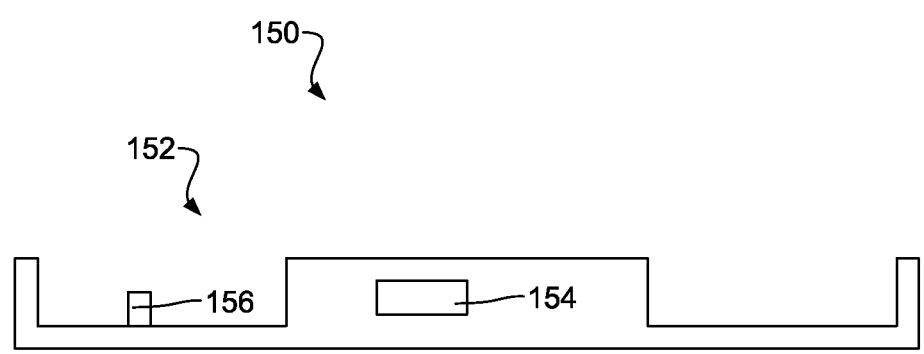
FIG. 1A illustrates a cross sectional view of an example of a dumbbell assembly in accordance with the present disclosure.

Particularly, with reference to the figures, FIG. 1A depicts a dumbbell assembly 150 that includes a cradle with a trough 152 sized to receive a weight of an adjustable dumbbell. The dumbbell assembly 150 also includes an input mechanism 154 in communication with a selection mechanism incorporated into the cradle. The selection mechanism includes a selector 156 that adjusts a connection of the weight in response to a command received from the input mechanism.

Figure 1B:
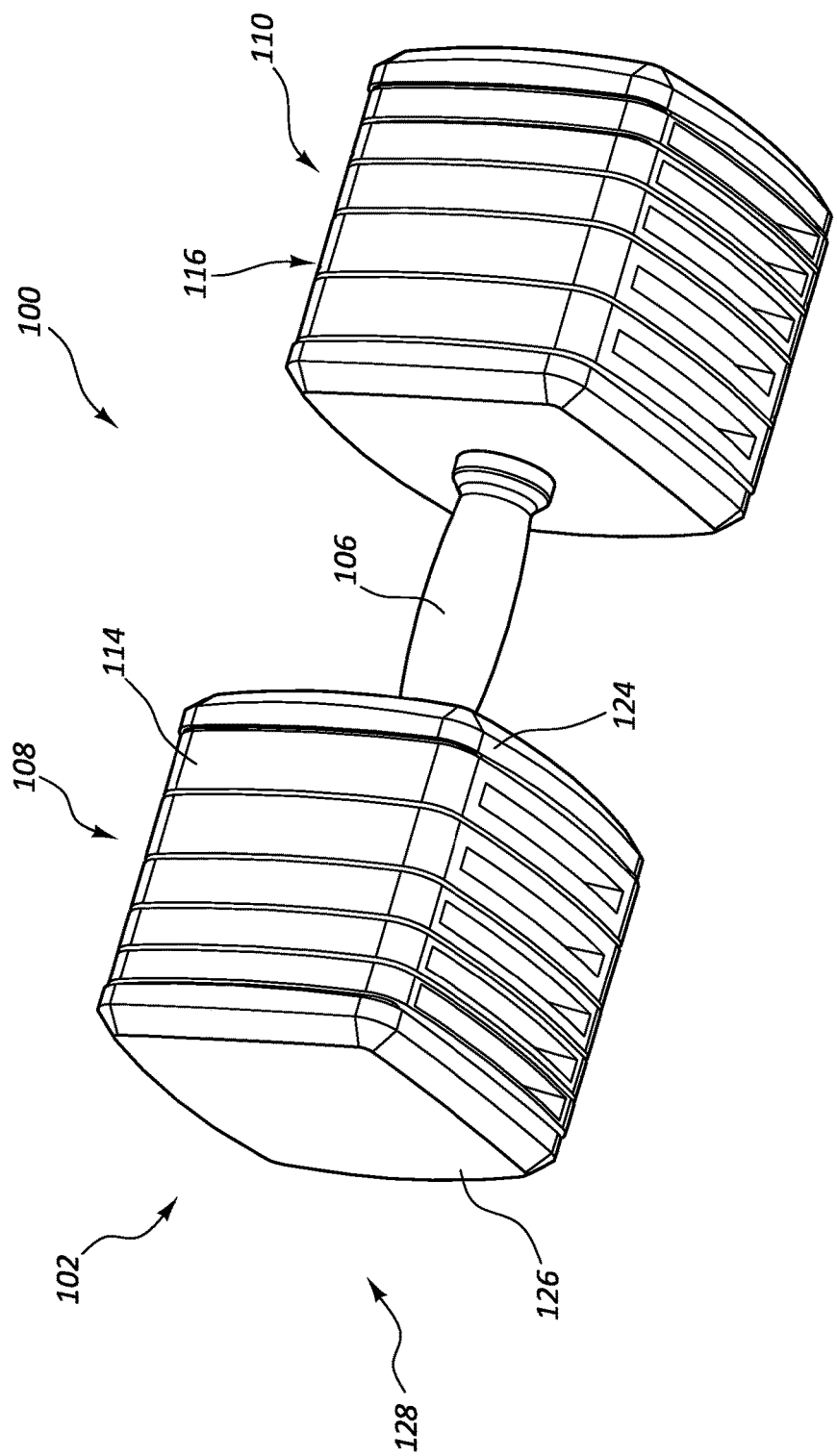
FIG. 1B illustrates a perspective view of an example of a dumbbell in accordance with the present disclosure.
Figure 2:
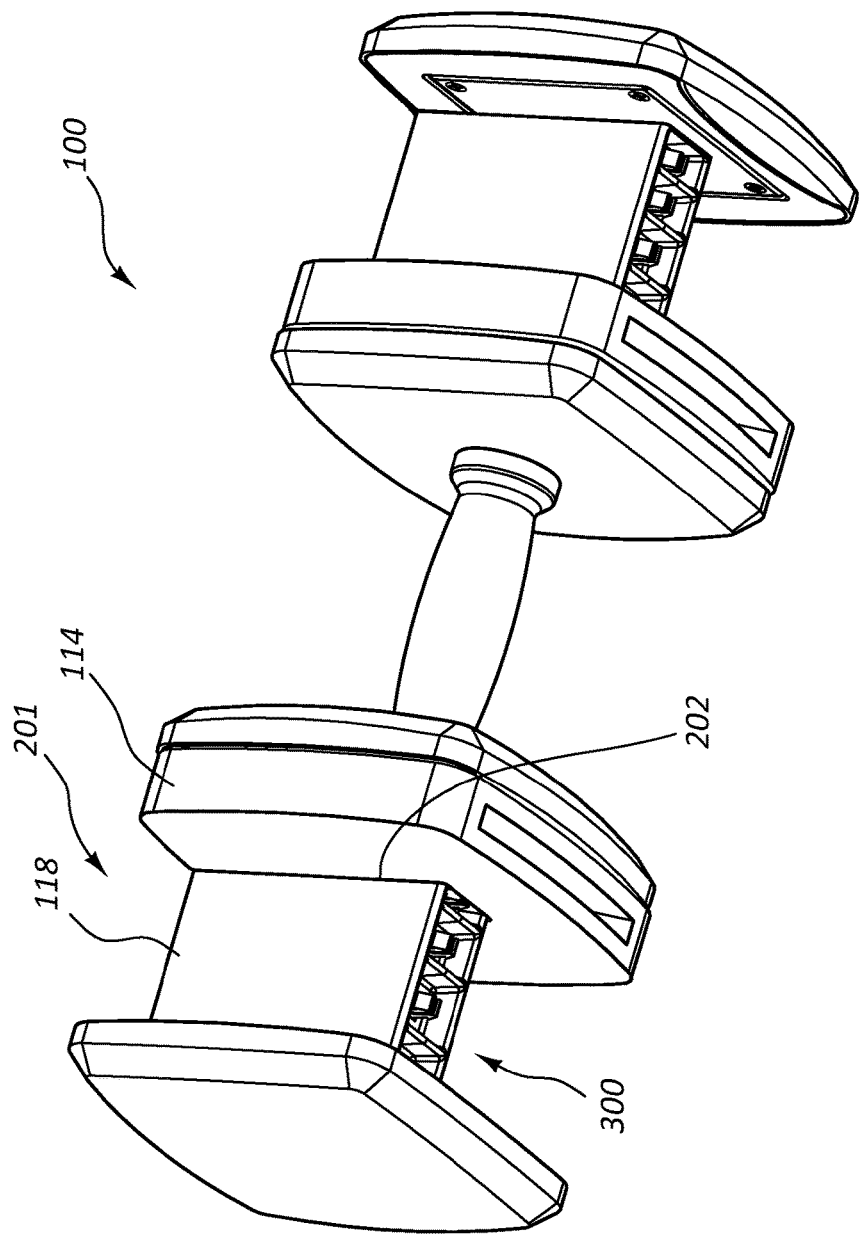
FIG. 2 illustrates a perspective view of the dumbbell of FIG. 1B with selected weights removed.

FIGS. 1B and 2 depict a dumbbell 100 that includes a support structure 102. In FIG. 1B, a full weight set is attached to the dumbbell 100. In FIG. 2, selected weights are removed from the dumbbell 100. The support structure 102 includes a carriage 201 and a handle 106.

The handle 106 is disposed between a first section 108 and a second section 110 of the carriage 201. The handle 106 is shaped to allow a user to grasp the handle 106 with his or her hand. While the handle 106 is depicted with a substantially circular cross section in the illustrated example, the handle 106 may include any appropriate type of shape. Further, the handle 106 may include a texture or other gripping surface that increases the friction between a user's hand and an outside surface of the handle 106. In some examples, the handle 106 includes a solid cross section, while in other examples, the handle 106 defines a cavity in which various types of components of the dumbbell 100 can reside. The handle 106 is also made, at least in part, of a material that has a sufficient strength to move the first and second sections 108, 110 of the carriage 201 loaded with weights 114 as the user moves the dumbbell 100 by moving the handle 106.

The carriage 201 may include one or more mechanisms for forming one or more connections between a weight 114 of a weight set 116. The weight set 116 may include multiple weights 114 that are selectively connected or disconnected to the carriage 201 of the support structure 102. Each of the weights 114 may include substantially the same mass. In other examples, the weights 114 can include different masses.

In the illustrated example, the first and second sections 108, 110 of the carriage 201 include a hanger 118 to which the weights 114 may attach. The weights 114 may include a slot 202 sized to accommodate the height and width of the hanger 118. In this example, the weights 114 may include an overall U-shape. Both the first and second sections 108, 110 of the carriage 201 may include an inner barrier 124 that separates the weights 114 from the handle 106 and an outer barrier 126 located on a distal end 128 of the dumbbell 100.

Figure 3:
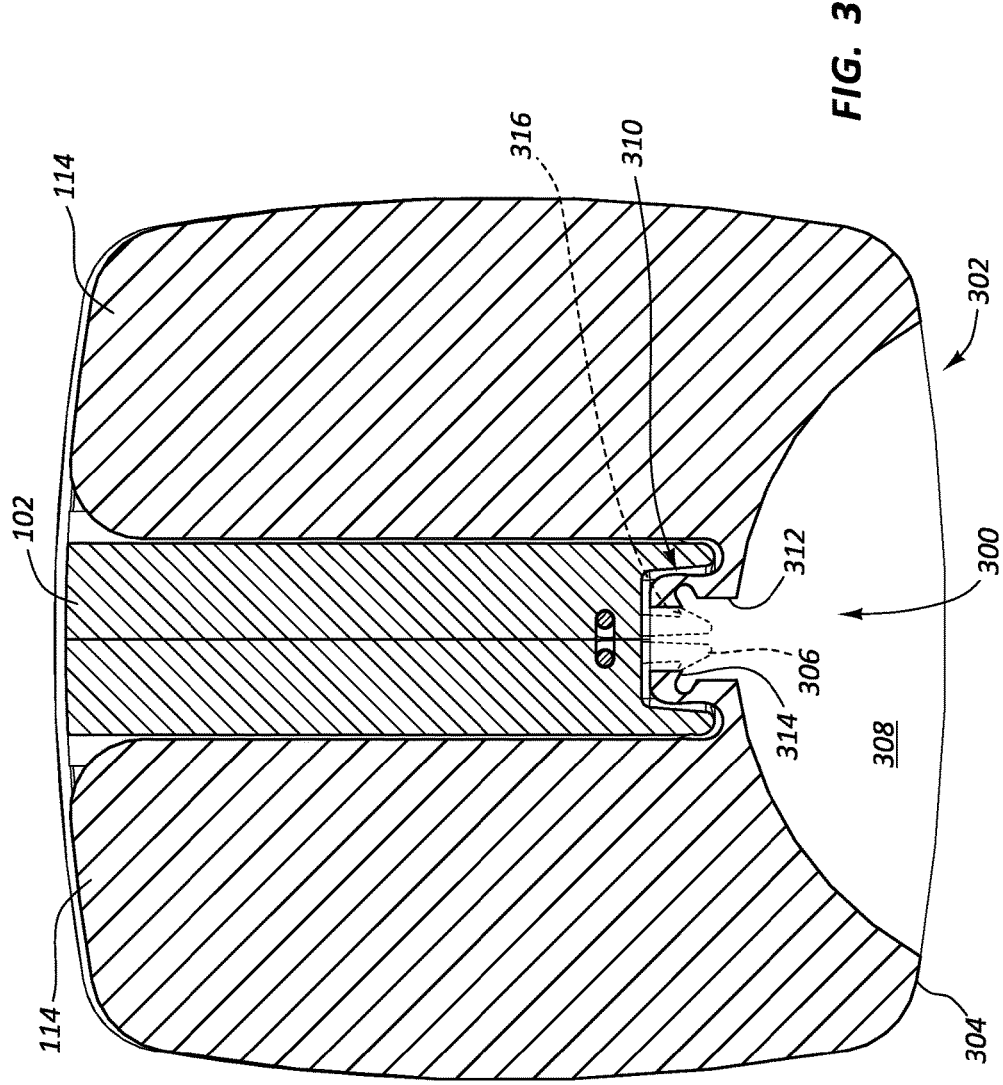
FIG. 3 illustrates a cross sectional view of the dumbbell and weights of FIG. 1B.
Figure 4:
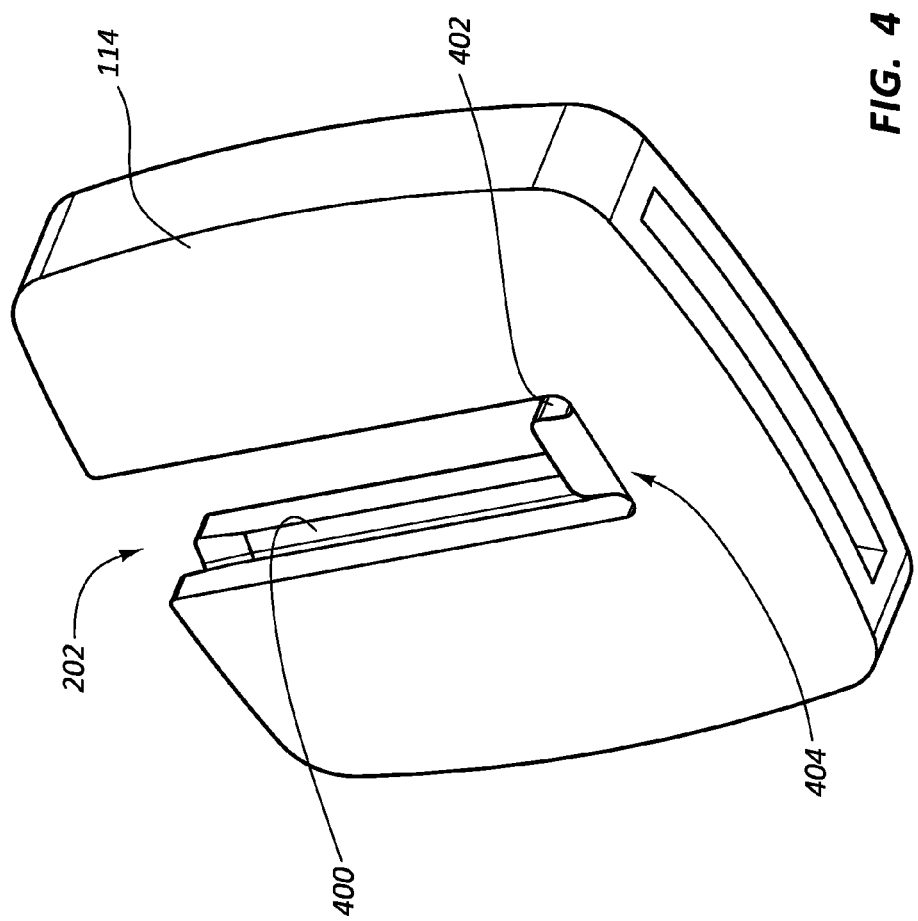
FIG. 4 illustrates a perspective view of an example of a weight in accordance with the present disclosure.
Figure 5:
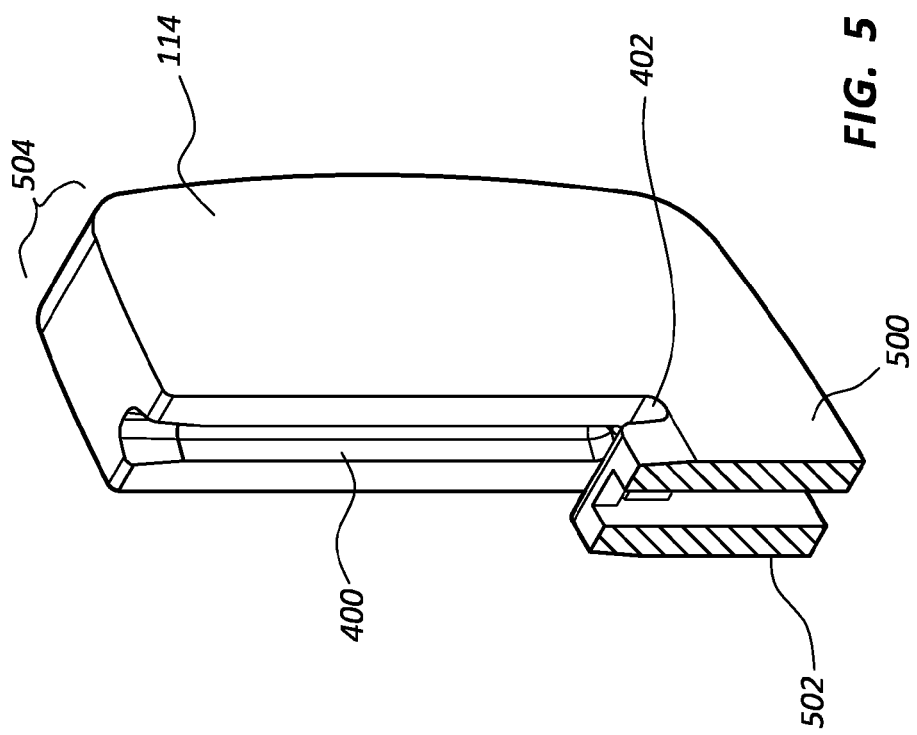
FIG. 5 illustrates a perspective cross sectional view of the weight of FIG. 4.

FIGS. 3-5 are perspective views of an example of a weight of a dumbbell 100. FIG. 3 depicts a cross sectional view of the weighs 114 attached to the hanger 118 of the support structure 102. FIG. 4 depicts a perspective view of a weight. FIG. 5 depicts a cross sectional perspective view of the weight in FIG. 4. In this example, the weights 114 connect to the underside 300 of the hanger 118 of the support structure 102. A cradle opening 302 is defined in a cradle side 304 of the weights 114 that provide access to connection features 306 of the hanger 118.

The cradle opening 302 opens into a cavity 308 defined in the weight 114. The cavity 308 also includes a structure opening 310 positioned proximate to where the dumbbell's support structure 102 fits into the weight 114. The cavity 308 narrows to define a neck 312 proximate the structure opening 310, and the neck 312 includes a catch 314 positioned to interlock with the connection features 306.

Figure 7:
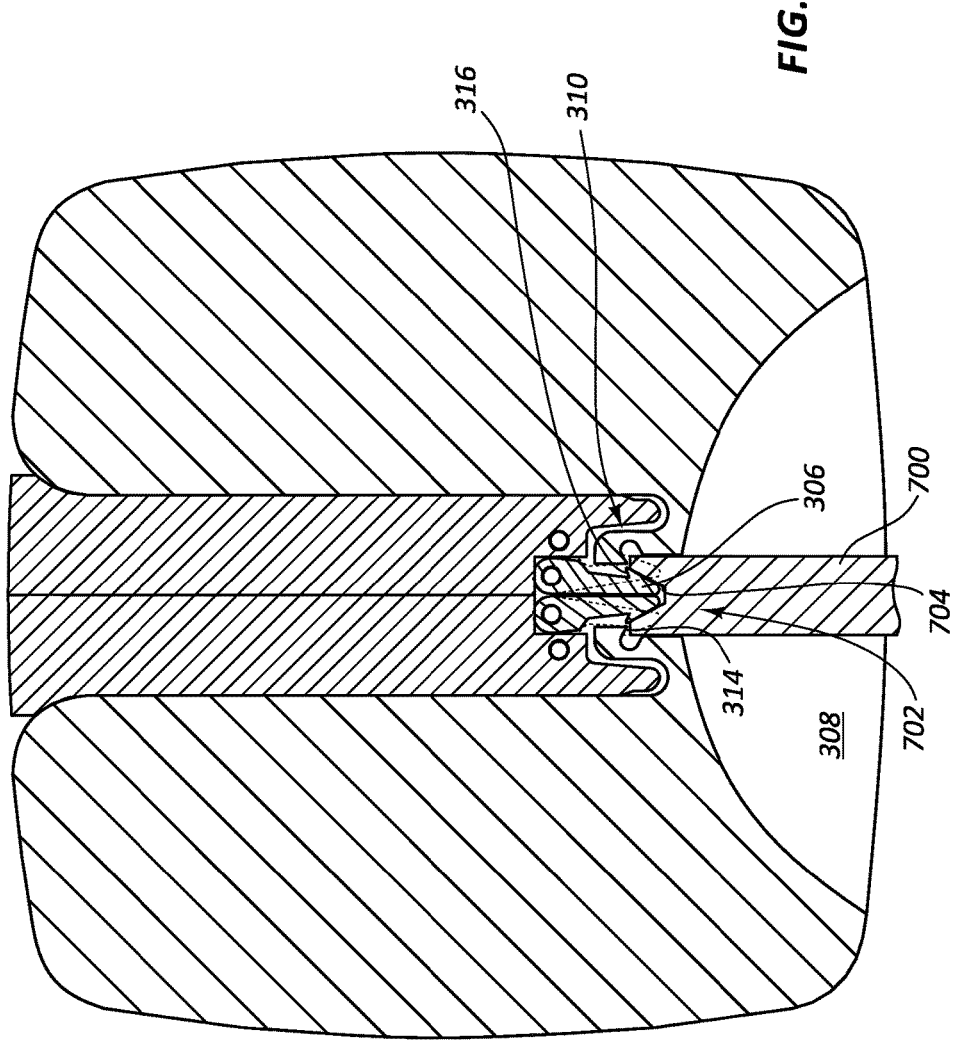
FIG. 7 illustrates a cross sectional view of the dumbbell and weights of FIG. 3 connected to an example of a cradle in accordance with the present disclosure.

The connection features 306 may be any appropriate type of feature that connects or disconnects the weights 114 with the support structure 102. In this example, the connection features 306 include hooks 316 that are positioned to interlock with the catch 314 formed in the weight 114 when the hook 316 is in an interlocking position as shown in FIG. 3. When the connection features 306 are interlocked with the catch 314, the weights 114 move with the support structure 102. Thus, in this scenario, if a user picks up the dumbbell 100 with the dumbbell's handle 106, the weight 114 is lifted out of the cradle with the dumbbell 100. When the hooks 316 are in a release position (as depicted in FIG. 7), the hooks 316 are away from the catch 314 so that the weight 114 is disconnected from the support structure 102. When the connection features 306 are disconnected from the catch 314, the weights 114 do not move with the support structure 102. Thus, in this scenario, if a user picks up the dumbbell 100 with the dumbbell's handle 106, the disconnected weight remains stationary in the cradle while the user moves the dumbbell 100.

In the illustrated examples, the weight 114 includes a slot 202 shaped to receive the support structure 102 of the dumbbell 100. As the weights 114 are upright in the cradle, the slots 202 of each of the weights 114 align so that the user can orient the dumbbell 100 so the support structure 102 can slide into multiple weight slots 202 simultaneously.

A longitudinal groove 400 may be defined along the length of the slot 202 which may accommodate a stabilization feature protruding from the support structure 102 as the support structure 102 slides into place. Additionally, a recess 402 may be defined in the closed end 404 of the slot 202. A protrusion formed on an underside 300 of the support structure 102 may interlock with these recesses 402 to provide additional stability between a connected weight 114 and the support structure 102.

The cradle opening 302 defined in a cradle side 304 of the weight 114 allows selectors incorporated into the cradle to have access to the connection features 306. The structure opening 310 defined in the closed end 404 of the slot 202 allows the connection features 306 to protrude into the cavity 308. Thus, the cavity 308 provides a space within the weight for components of the dumbbell 100 to directly interact with components of the cradle. The interaction between these components determines whether the weight 114 is connected or disconnected with the support structure 102. The cavity 308 defines a through path in a central portion of the weight 114. Further, the cavity is opened to receive components from the cradle and to receive components from the dumbbell 100. The cavity 308 is enclosed by a first face 500 of the weight 114 and a second face 502 of the weight 114. Further, the weight 114 is enclosed along a thickness 504 of the weight 114.

While this example has been described with reference to a specific cavity shape, any appropriate cavity shape may be used in accordance with the principles described in the present disclosure. For example, the cavity may have an opening in a weight face, the catch may be formed in an area of the cavity outside of the neck, the cavity may contain no neck, the cavity may contain additional openings, the cavity may incorporate other features, the cavity may lack some of the features described above, or combinations thereof.

Figure 6:
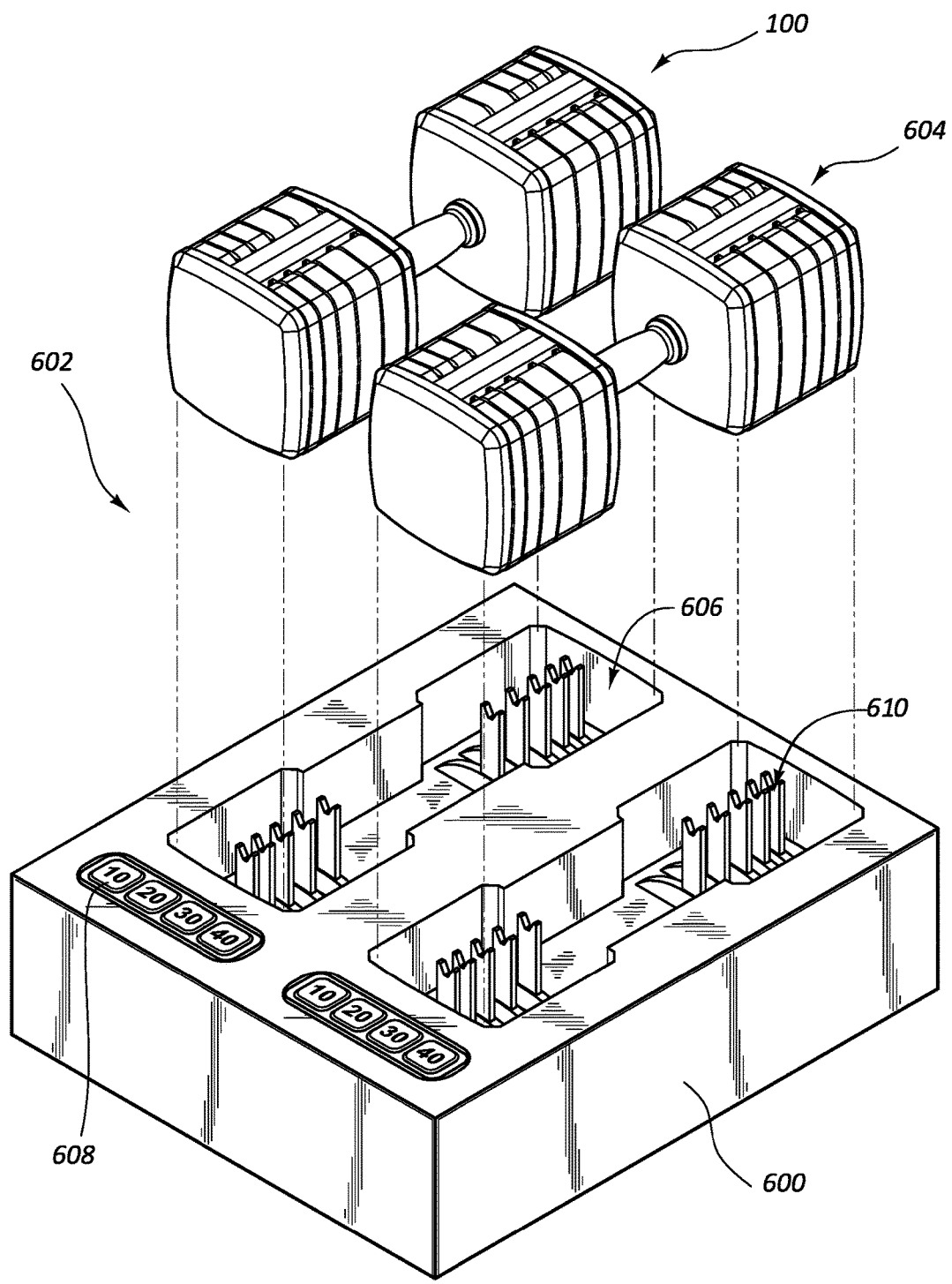
FIG. 6 illustrates a perspective view of an example of a dumbbell and an example of a cradle in accordance with the present disclosure.

FIG. 6 depicts a cradle 600 shaped and sized to receive at least one dumbbell. The cradle 600 may be part of a dumbbell assembly 602 where the dumbbell assembly 602 includes a first dumbbell 100 and a second dumbbell 604. The second dumbbell 604 may be of the same type and make as the dumbbell 100. For purposes of this disclosure, the first and second dumbbells include the same structure, shape, function, and construction as each other. Thus, in examples of the present invention that incorporate the first dumbbell depicted in FIG. 1B, the second dumbbell 604 also includes a second handle, a second support structure, a second carriage, a second weight set, and other features similarly described to those of the dumbbell 100 of FIG. 1B. But, in other examples, the second dumbbell 604 may differ slightly or significantly in structure, shape, function, and construction with respect to the dumbbell 100.

The cradle 600 includes multiple troughs 606 sized and shaped to receive individual weights 114 from the first and second dumbbells 100, 604. As the first and second dumbbells 100, 604 are docked in the cradle 600, the individual weights align with and are received into the multiple troughs 606 of the cradle 600. The troughs 606 may be sized and shaped to support each individual weight 114 so that in the absence of the support structure and other components of either the first or second dumbbell 100, 604 the individual weights may stand upright. As such, little to no gap may exist between the outer surface of the weights 114 and the inner surfaces of the troughs 606 when the weights are disposed upright within the troughs 606. While this example is depicted with two troughs to receive two different dumbbells, any appropriate number of troughs may be used. For example, a single trough to receive a single dumbbell may be incorporated into the cradle 600. In other examples, three or more troughs are defined in the cradle 600.

The cradle 600 may include an input mechanism 608. This input mechanism 608 of the dumbbell assembly 602 allows the user to provide an input that causes the weight connections of the first dumbbell 100 and/or second dumbbell 604 to change. In some cases, these changes occur simultaneously. In other cases, the changes may occur at different moments in time but still in response to the input from the single input mechanism. While the illustrated example depicts the input mechanism 608 as push buttons, any appropriate input mechanism may be used in accordance with the principles described in the present disclosure. For example, the input mechanism 608 may include a touch screen, a key pad, a button, a lever, a switch, a slider, a microphone, a sensor, a rotary dial, another type of input mechanism, or combinations thereof. In alternative examples, the input mechanism 608 may include a wireless mechanism, such as a transceiver, that is capable of receiving a message from a remote source. For example, the wireless mechanism may be capable of receiving instructions from a computing device to operate a selector of the dumbbell assembly 602 in this manner that adjusts the connections between the weights 114 and the support structures of the first and second dumbbells 100, 604.

In this example, the input mechanism 608 can be connected to a mobile device which includes a touch screen that allows a user to select a desirable amount of weight for each of the first and second dumbbells 100, 604. In this example, the touch screen includes a first button set that corresponds to the dumbbell 100 and a second button set that corresponds to the second dumbbell 604. In some examples, a single button set is used to select the same amount of weight for each dumbbell 100, 604 at the same time. In some examples, the selectors that cause the appropriate amount of weight to be connected or disconnected to the dumbbells is capable of causing only a single amount of weight to be connected to both of the dumbbells 100, 604 at the same time. In other examples, the selectors are capable of independently adjusting the amount of weight for each dumbbell without affecting the amount of weight connected to the other dumbbell. This mobile devices may use any appropriate type of user interface for communicating the amount of weight to adjust. For example, this mobile device may include levers, rotary dials, joy sticks, scroll buttons, other types of mechanism, or combinations thereof to send instructions for adjusting the weight amount.

In other examples, a cloud based device located in a remote location from the dumbbell assembly 602 is capable of communicating with the dumbbell assembly 602. This cloud based device may be a device used to run a website that allows the user to input personal information, create a user profile, input exercise routines and performance, input nutritional information, input goals, input other types of information, or combinations thereof. This cloud based device may be part of a local area network, a data center, the internet, a private based network, a wide area network, another type of network, or combinations thereof. This device may be capable of determining future workouts for the user. The user may input into the remote device through a local user interface the types of exercise programs that the user desires. Based on the user's past performance, user profile, and/or user goals, the remote device may determine for the user the amount of weight for each dumbbell. This remote device may send messages to the dumbbell assembly 602 to adjust the weight. In some examples, the remote device additionally sends instructions to the user for the types of exercises to perform. For example, the remote device may instruct the user to perform a particular type of lift, instruct the user on the particular number of sets and repetitions to perform for each lift, the amount of time to rest between lifts, other types of information, or combinations thereof.

In some examples, the user may wear a heart rate monitor or another type of physiological parameter sensor that sends data to the input mechanism which sends the information to the remote device. In other examples, this physiological information is sent directly to the remote device. In examples where the remote device receives at least near real time physiological information about the user, the remote device can alter the workout instructions to the user and/or the amount of weight loaded to the dumbbells 100, 604. The near real time physiological information about the user may include information about the user's heart rate, blood pressure, oxygen saturation, calories burned, exercise movement speed, temperature, muscle contraction, other types of muscle activity, other types of physiological parameters, or combinations thereof.

The cradle 600 may include selectors 610 that are incorporated into the troughs 606 of the cradle 600. These selectors 610 may be spaced within the cradle 600 so that each of the selectors 610 correspond to each weight of the dumbbell's weight set. As the dumbbells are received in the troughs 606, the selectors 610 protrude into the cavities 308 of the weights 114 from the cradle opening 302. The linear position of the selectors 610 is adjustable and is controlled based on the user input through the input mechanism 608. The linear position of the selectors 610 also determines whether the weight associated with the selector 610 is connected to the dumbbell or released from the dumbbell.

FIG. 7 depicts an example of a selector 610 incorporated into the cradle 600. In this example, the input mechanism 608 is incorporated into the cradle 600. The input mechanism 608 may be in communication with processing resources that are capable of sending instructions to the selectors 610. In the illustrated examples, the selector 610 includes a rod 700 that includes a first linear position and a second linear position. A linear actuator that may be directly or indirectly in communication with the input mechanism 608 and may cause the rod 700 to be in the first linear position or the second linear position. In the first linear position, a distal end 702 of the selector 610 engages the connection features 306 causing the connection features 306 to disconnect the weight 114 from the support structure 102. The shape of the distal end 702 includes at least one ramp 704 positioned to move the hooks 316 from the interlocking position to the release position.

In the second linear position of the selector 610, the distal end 702 moves away from the connection features 306. In this situation, the distal end 702 may not inhibit the connection features 306 from moving. The connection features 306 may be spring loaded or otherwise urged into the interlocking position when no opposing force is applied to put the connection features 306 into the release position. Thus, as the distal end 702 moves out of the way, the connection features 306 move back into the interlocking position.

In the illustrated example, when the first and second dumbbells 100, 604 are docked in the cradle 600, the selector can disconnect the corresponding weights 114 by moving the rod 700 into the first linear position. For those weights 114 that are to remain connected to the first and second dumbbells 100, 604, the rods 700 are positioned so that the rods do not cause the connection features 306 to release the weights 114. Alternatively, the rods 700 may move to release the weights and reconnect them.

In some examples, the dumbbell's structure may be five pounds without any of the weights attached. In this example, one of the weights 114 may be a five pound plate, and when the five pound plate is attached to the dumbbell's structure, the total weight of the dumbbell 100 is ten pounds. Additional weights may be ten pound weights. In this example, the combination of the five pound plate, ten pound plate, and the dumbbell's structure make the overall weight of the dumbbell twenty pounds. The dumbbell 100 may include any appropriate number of weights with any appropriate mass. The user may use the input mechanism 608 to connect and/or disconnect any combination of weights 114 from the dumbbell's support structure 102. Thus, a user may input the desirable amount of weight for the dumbbell 100 into the input mechanism 608. For example, the user may indicate through the input mechanism that the desirable weight is thirty pounds. In this example, the selection mechanisms of the dumbbell assembly 602 may cause the appropriate changes to the connections of the weight sets to cause each of the first and second dumbbells 100, 604 to have an overall weight of thirty pounds.

Figure 8:
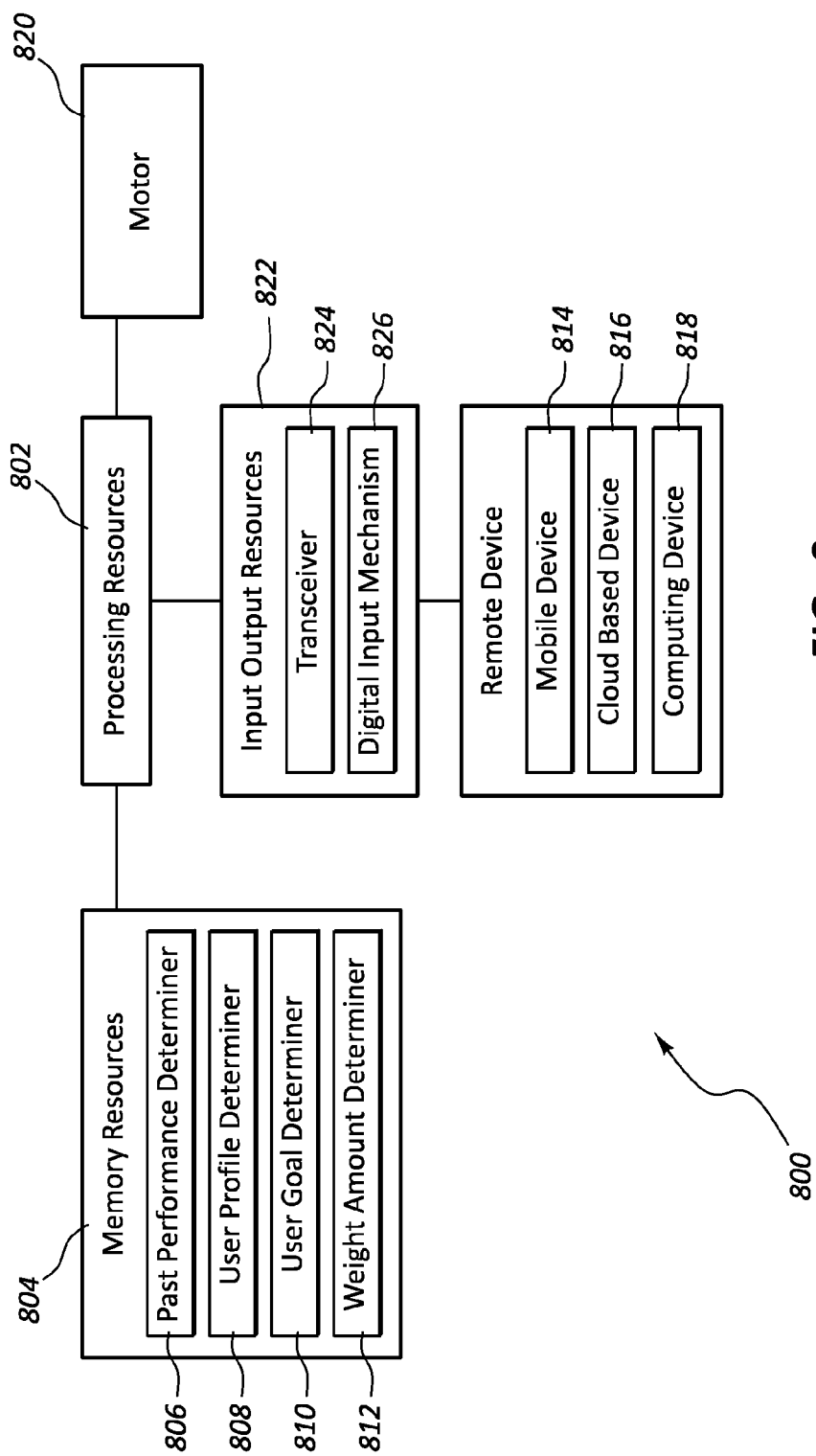
FIG. 8 illustrates a block diagram of an example of a selection system in accordance with the present disclosure.

FIG. 8 illustrates a block diagram of an example of a system 800 for adjusting weight of an adjustable dumbbell. The system 800 may include a combination of hardware and programmed instructions for executing the functions of the system 800. In this example, the system 800 includes processing resources 802 that are in communication with memory resources 804. Processing resources 802 include at least one processor and other resources used to process the programmed instructions. The memory resources 804 represent generally any memory capable of storing data such as programmed instructions or data structures used by the system 800. The programmed instructions shown stored in the memory resources 804 include a past performance determiner 806, a user profile determiner 808, a user goal determiner 810, and a weight amount determiner 812.

Further, the processing resources 802 may be in communication with user information and/or workout environment information that may be stored in the memory resources 804 locally or off site. For example, the processing resources 802 may be in communication with a remote device that stores the user information or workout environment information. This remote device may be a mobile device 814, a cloud based device 816, a computing device 818, another type of device, or combinations thereof. In some examples, the system communicates with the remote device through the mobile device 814 which relays communications between the system 800 and the remote device. In other examples, the mobile device 814 has access to information about the user and/or workout environment. In some cases, the remote device collects information about the user during his or her workout or in general. In this example, a treadmill used by the user may send information to the remote device indicating how long the user ran, the number of calories burned by the user, the average heart rate of the user during the workout, other types of information about the workout, or combinations thereof. This information may be used by the programmed instructions for executing its functions. The remote device may execute a program that can provide useful information to the system 800. An example of a program that may be compatible with the principles described herein includes the iFit program which is available through www.ifit.com and administered through ICON Health and Fitness, Inc. located in Logan, Utah, U.S.A. An example of a program that may be compatible with the principles described in this disclosure are described in U.S. Pat. No. 7,980,996 issued to Paul Hickman. U.S. Pat. No. 7,980,996 is herein incorporated by reference for all that it discloses. In some examples, the user information accessible through the remote device includes the user's age, gender, body composition, height, weight, health conditions, other types of information, or combinations thereof. Further, the workout environment information that may be accessible to the remote device may include humidity data, temperature data, elevation data, atmospheric pressure data, sunlight exposure data, other types of environmental data, or combinations thereof.

The processing resources 802, memory resources 804, and remote devices may communicate over any appropriate network and/or protocol through the input/output resources 822. In some examples, the input/output resources 822 includes a transceiver 824 for wired and/or wireless communications. For example, these devices may be capable of communicating using the ZigBee protocol, Z-Wave protocol, BlueTooth protocol, Wi-Fi protocol, Global System for Mobile Communications (GSM) standard, another standard, or combinations thereof. In other examples, the user can directly input some information into the system 800 through a digital input/output mechanism 826, a mechanical input/output mechanism, another type of mechanism, or combinations thereof.

The memory resources 804 include a computer readable storage medium that contains computer readable program code to cause tasks to be executed by the processing resources 802. The computer readable storage medium may be a tangible and/or non-transitory storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, magnetic based memory, other types of memory, or combinations thereof.

The past performance determiner 806 represents programmed instructions that, when executed, cause the processing resources 802 to determine the past performance of the user's workout. The past performance may indicate to the system 800 the amount of weight that the user has lifted in previous workouts, which can be used for making a decision about the amount of weight that the user ought to lift during the present workout. Further, the past performance determiner 806 may also determine the amount of exercise/calories that the user has recently performed/burned. This information can also aid in a decision for the amount of weight for the user to lift. As described above, the system 800 may receive information about other types of workouts that the user recently performed, such as treadmill workouts. But, information about other types of workouts may also be available to the system 800. In this situation where the past performance determiner 806 determines that the user performed a significant workout recently, such as an hour long run on a treadmill that ended less than ten minutes ago, the system 800 may determine that the user cannot lift weights at a level when the user is fresh because of the amount of calories that the user recently burned. In another example, the past performance determiner 806 may determine that the user recently performed a number of weighted underhand pull ups. In this situation, the past performance determiner 806 may also determine when the user cannot lift as much as the user is usually capable of lifting because of the recent exercises performed.

The user profile determiner 808 represents programmed instructions that, when executed, cause the processing resources 802 to determine information about the user based on information stored in the remote device, the cradle, a mobile device, another device in the system 800, or combinations thereof. This information, like age, weight, height, and so forth, may be used to determine, at least in part, the amount of weight for the user to lift.

The user goal determiner 810 represents programmed instructions that, when executed, cause the processing resources 802 to determine the user's goals. For example, if the user's goal is to build muscle mass, the system 800 may determine to increase the amount of weight for the user and indicate that a shorter number of repetitions should be executed during the lift. On the other hand, if the user's goal is to build strength while keeping a lean physique, the system may determine to have the user lift a lighter weight amount with a greater number of repetitions.

The weight amount determiner 812 represents programmed instructions that, when executed, cause the processing resources 802 to determine an amount of weight for the user to lift based on the past performance information, user profile information, user goal information, other types of information, or combinations thereof. In response to determining the amount of weight for the user to lift, the weight amount determiner 812 may send instructions to a motor 820 to move the selectors 610 to cause the weights 114 to connect and/or disconnect from the support structure 102 so that the overall weight of the first and second dumbbells 100, 604 is the desired weight.

While the weight amount determiner 812 has been described with reference to making decisions based on past performance information, user profile information, and user goal information, the weight amount determiner 812 may use any appropriate type of information to make a decision about the amount of weight for the user to lift. For example, the weight amount determiner 812 may base the decision, at least in part, on nutritional information (such as the type and amount of food ingested by the user over the course of a recent time period), health information, workout environment information, user input, other types of information, or combinations thereof.

In some examples, the weight amount determiner 812 determines the type of workout that the user desires to do. In this situation, the weight amount determiner 812 may receive the workout type directly from the user. For example, the user may indicate to the system 800 that the user desires to perform curl exercise to work his or her biceps. The weight amount determiner 812 may select a weight amount based on the input about the curl exercise. In accordance, the selection mechanism may cause the appropriate amount of weight to be connected to the support structures 102 and the user may remove the first and second dumbbells 100, 604 from the cradle 600 to perform the indicated exercises. After the user performs the indicated exercise, the user may return the dumbbells to the cradle 600. Next, the user may indicate to the system 800 that the user desires to perform another type of exercise, such as the military press exercise, with the first and second dumbbells 100, 604. In this example, the weight amount determiner 812 may account for the newly performed curl exercises along with other types of information to determine the weight to select for the military press exercise. The system 800 may accordingly cause the selected amount of weight to be connected to the support structure 102 for the military press exercises.

The user may indicate to the system 800 the workout type through any appropriate mechanism. In some examples, the user may speak into a microphone associated with the system 800 to indicate the workout type. In other examples, the user may use a button, a touch screen, a lever, or another input mechanism incorporated into the cradle, the dumbbell 100, a mobile device, a remote device, another type of device, or combinations thereof.

In other examples, the user is participating in a predetermined program that selects the type of exercises for the user to perform. For example, the user may select a program that is intended to work out a selected muscle group or to enhance performance in a particular type of sport. In this situation, the user may not have to indicate the workout type to the system 800.

Further, the memory resources 804 may be part of an installation package. In response to installing the installation package, the programmed instructions of the memory resources 804 may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources 804 can include integrated memory such as a hard drive, a solid state hard drive, or the like.

In some examples, the processing resources 802 and the memory resources 804 are located within the cradle 600, the dumbbell 100, the mobile device 814, an exercise machine, a remote device, another type of device, or combinations thereof. The memory resources 804 may be part of any of these device's main memory, caches, registers, non-volatile memory, or elsewhere in their memory hierarchy. Alternatively, the memory resources 804 may be in communication with the processing resources 802 over a network. Further, data structures, such as libraries or databases containing user and/or workout information, may be accessed from a remote location over a network connection while the programmed instructions are located locally. Thus, the system 800 may be implemented with the cradle 600, the first or second dumbbell 100, 604, an exercise machine, a user device, a mobile device, a phone, an electronic tablet, a wearable computing device, a head mounted device, a server, a collection of servers, a networked device, a watch, or combinations thereof. This implementation may occur through input mechanisms, such as push buttons, touch screen buttons, voice commands, dials, levers, other types of input mechanisms, or combinations thereof. Any appropriate type of wearable device may include, but are not limited to glasses, arm bands, leg bands, torso bands, head bands, chest straps, wrist watches, belts, earrings, nose rings, other types of rings, necklaces, garment integrated devices, other types of devices, or combinations thereof.

The system 800 of FIG. 8 may be part of a general purpose computer. But, in alternative examples, the system 800 is part of an application specific integrated circuit.

Figure 9:
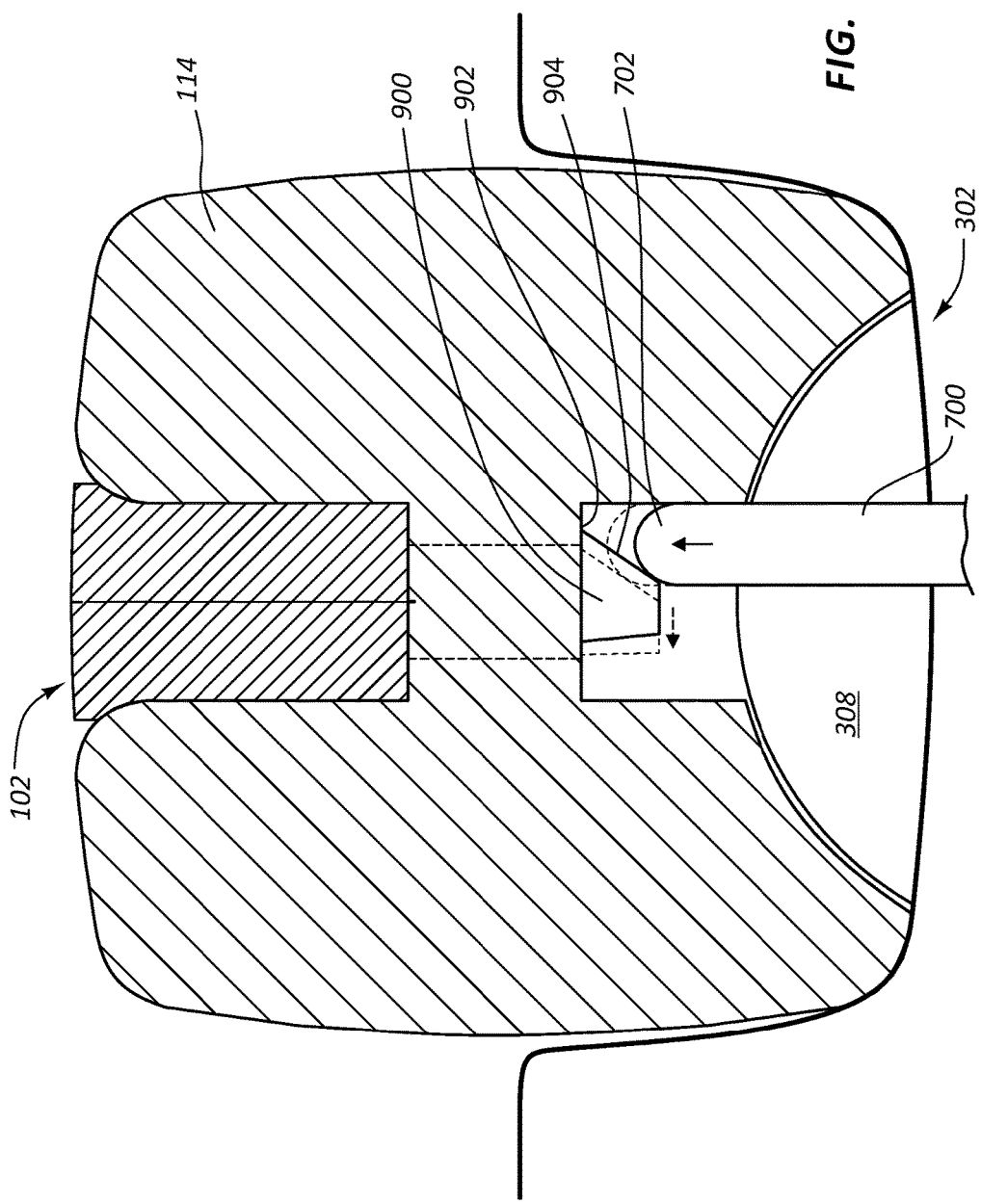
FIG. 9 illustrates a cross sectional view of an example of a dumbbell and weights connected to an example of a cradle in accordance with the present disclosure.

FIG. 9 illustrates a cross sectional view of an example of a dumbbell 100 and a weight 144 connected to an example of a cradle 600 in accordance with the present disclosure. In this example, the connection feature 306 includes an urged member 900 that when without a force from the selector 610, the urged member hooks the underside 902 of the weight. The urged member 900 may be urged to move the right side, the left side, or another direction within the weight's cavity 308.

The rod 700 of the selector 610 may cause the urged member 900 to move in this manner to cause the urged member 900 to unhook from the underside 902 of the weight. In some examples, the movement of the urged member 900 by the rod 700 causes the urged member 900 to align with a center of the weight 114. In the illustrated example, the urged member 900 includes a ramp 904 that causes the urged member 900 to move in a direction that is transverse the linear movement of the rod 700. Thus, as the rod 700 moves into a release position, the distal end 702 of the rod 700 contacts the ramp 904. The angle of the ramp 904 determines how far the urged member 900 translates compared to the linear movement of the rod 700. In this example, the rod 700 is located off center with respect to the weight 114.

In other examples, the movement of the urged member 900 causes the urged member to move to the right side or the left side where the urged member is off centered, but still unhooked from the weight 114. In some examples, the urged member 900 interlocks with an aperture or another type of formation in the weight other than the underside 902. In this example, the distal end 702 or another feature of the rod 700 contacts a region of the urged member 900 to cause the urged member 900 to unhook from the aperture or other type of formation.

The urged member 900 may be movable by being incorporated into a track (not shown) that allows the urged member 900 to slide along a desired path. This path may be spring loaded with a spring, an elastomeric material, a ramp, a wedge, another type of mechanism, or combinations thereof. In other examples, the shape of the urged member 900 provides a spring force to cause the urged member 900 to hook or otherwise interlock with the weight 114. The movement of the rod 700 may cause the urged member 900 to bend back so that the urged member 900 unhooks.

FIG. 10 illustrates a cross sectional view of an example of a dumbbell 100 and a weight 114 connected to an example of a cradle 600 in accordance with the present disclosure. In this example, the selector 610 is incorporated into a side of the trough 606. A linear actuator 1000, such as a screw actuated mechanism, is positioned to move a pin 1002 into a receptacle 1004 defined in the support structure 102. As the linear actuator 1000 actuates in a locking direction, the pin 1002 is moved towards the support structure 102 into the receptacle. As the linear actuator moves in a release direction, the pin 1002 is moved away from the support structure 102 out of the receptacle 1004.

The pin 1002 may be integrally formed in a moving member of the linear actuator 1000. In other examples, the pin is connected to the linear actuator 1000 through a spring 1006. This spring 1006 may cause the pin 1002 to retract as the linear actuator retracts from the support structure 102. While this example has been described with reference to the pin interlocking with a receptacle, the pin may interlock with any appropriate feature of the support structure, such as an aperture, a lip, an underside, a protrusion, another type of feature, or combinations thereof.

Additionally, while these examples have been described with reference to a particular type of connection feature, any appropriate type of connection feature may be used in accordance with the principles described in the present disclosure. For example, the connection features may be incorporated into the weights, incorporated into the dumbbells, incorporated into the cradle, or combinations thereof. In other examples, the features may include hooks, interlocking pins, compression mechanisms, balls, springs, pivots, grips, other types of features, or combinations thereof.

Also, while the examples above have been described with reference to specific types of selectors, any appropriate type of selector may be used in accordance with the principles described in the present disclosure. For example, the selectors may include cams, rods, linear actuators, pivots, screw mechanisms, latches, hooks, other mechanisms, or combinations thereof. Additionally, while the examples above have been described with reference to weights with specific shapes and features, any appropriate type of weight shape or feature may be used in accordance with the principles described in the present disclosure.

Further, while the examples above have been described with reference to a remote device being a mobile device, any appropriate type of device may be used in accordance with the principles described herein. For example, the remote device may be a cloud based device, a mobile device, a wearable computing device, a laptop, a desktop, a network device, digital device, another type of device, or combinations thereof.

INDUSTRIAL APPLICABILITY

In general, the invention disclosed herein may provide a user with a dumbbell assembly that is capable of adjusting the amount of weight connected to the dumbbell through mechanisms incorporated into the cradle. The control for actuating the selectors of the cradle that adjust the connections between the weights and the support structure of the dumbbells may be incorporated into the cradle or is capable of being received from a remote location. In this example, the dumbbell assembly includes logic that is capable of determining the amount of weight to be connected and/or disconnected to the dumbbells. In this example, the instructions from the remote device may be considered as a factor for determining the amount of weight to load to the dumbbells. For example, the instructions from the remote device may include health data, personal data, past performance data, goal data, other types of data, or combinations thereof. The dumbbell assembly's logic may consider at least some of these factors received from the remote device when determining the amount of weight to load to the dumbbells. In other examples, the remote device may instruct the dumbbell assembly to load an amount of weight to the dumbbells, and the dumbbell assembly may determine whether to follow these instructions. For example, the dumbbell assembly may include an override option where the dumbbell assembly determines to load a different amount of weight to the dumbbells other than the amount of weight that the dumbbell assembly was instructed to load.

The input mechanism may be in direct or indirect communication with a selector that is incorporated into the dumbbell, weights, cradle, or combinations thereof. The selectors are arranged to make adjustments to the connections between the weights sets and the dumbbells. The selectors may be incorporated directly into the cradle, the dumbbells, or the weights.

The cradle may include multiple troughs for receiving multiple dumbbells. When docked in the troughs, the connection between the weights and the dumbbells can be changed simultaneously in each dumbbell or a subset of dumbbells by using the single input mechanism. The input mechanism may be arranged to receive manual input from a user or receive a remote signal from the remote device. The remote device may be a mobile device, a device operated by a remote trainer, a cloud based device executing an exercise program, exercise equipment, another type of device, or combinations thereof.

In some examples, the dumbbell that includes a support structure, and the support structure includes a carriage and a handle. The handle may disposed between a first section and a second section of the carriage. The handle is shaped to allow a user to grasp the handle with his or her hand. In some examples, the handle includes a solid cross section, while in other examples, the handle defines an internal cavity in which various types of dumbbell components can reside. The handle is also made, at least in part, of a material that has a sufficient strength to move the carriage when loaded with weights as the user moves the dumbbell by moving the handle.

The weight set may include multiple weights that can be selectively connected or disconnected to the carriage of the support structure. Each of the weights may include substantially the same mass. In other examples, the weights can include different masses.

The first and second sections of the carriage may include a hanger to which the weights may attach. The weights may include a slot sized to accommodate the height and width of the hanger. In this example, the weights may include an overall U-shape. Both the first and second sections may include an inner barrier that separates the weights from the handle and an outer barrier located on a distal end of the dumbbell.

The weights may connect to the underside of the hanger. A cradle opening may be defined in a cradle side of the weights that provide access to connection features of the hanger. The cradle opening may open into a cavity defined in the weight. The cavity also includes a structure opening positioned proximate to where the dumbbell's support structure fits into the weight. The cavity narrows to form a neck proximate the structure opening, and the neck includes a catch positioned to interlock with the connection features.

The connection features may be any appropriate type of feature that connects or disconnects the weights with the support structure. For example, the connection features may include hooks that are positioned to interlock with the catch formed in the weight when the hook is in an interlocking position. When the connection features are interlocked with the catch, the weights move with the support structure. Thus, in this scenario, if a user picks up the dumbbell with the dumbbell's handle, the weight is lifted out of the cradle with the dumbbell. When the hooks are in a release position, the hooks are away from the catch so that the weight is disconnected from the support structure. When the connection features are disconnected from the catch, the weights do not move with the support structure. Thus, in this scenario, if a user picks up the dumbbell with the dumbbell's handle, the disconnected weight remains stationary in the cradle while the user moves the dumbbell.

The weight may also include a slot shaped to receive the support structure of the dumbbell. As the weights are upright in the cradle, the slots of each of the weights align so that the user can orient the dumbbell so that the support structure can slide into multiple weight slots simultaneously.

A longitudinal groove may be defined along the length of the slot which may accommodate a stabilization feature protruding from the support structure as the support structure slides into place. Additionally, a recess may be defined in the closed end of the slot. A protrusion formed on an underside of the support structure may interlock with these recesses to provide additional stability between a connected weight and the support structure.

The cradle opening may be defined in a cradle side of the weight and may allow selectors incorporated into the cradle to have access to the connection features. The structure opening defined in the closed end of the slot allows the connection features to protrude into the cavity. Thus, the cavity provides a space within the weight for components of the dumbbell to directly interact with components of the cradle. The interaction between these components determines whether the weight is connected or disconnected with the support structure. The cavity defines a through path in a central portion of the weight. Further, the cavity is opened to receive components from the cradle and to receive components from the dumbbell. The cavity is enclosed by a first face of the weight and a second face of the weight. Further, the weight is enclosed along a thickness of the weight.

Any appropriate cavity shape may be used in accordance with the principles described in the present disclosure. For example, the cavity may have an opening in a weight face, the catch may be formed in an area of the cavity outside of the neck, the cavity may contain no neck, the cavity may contain additional openings, the cavity may incorporate other features, the cavity may lack some of the features described above, or combinations thereof.

The cradle may be part of a dumbbell assembly where the dumbbell assembly includes a first dumbbell and a second dumbbell. The second dumbbell may be of the same type and make as the dumbbell. For purposes of this disclosure, the first and second dumbbells include the same structure, shape, function, and construction as each other.

The cradle may include multiple troughs sized and shaped to receive individual weights from the first and second dumbbells. As the first and second dumbbells are docked in the cradle, the individual weights align with and are received into the multiple troughs of the cradle. The troughs may be sized and shaped to support each individual weight so that in the absence of the support structure and other components of either the first or second dumbbell the individual weights may stand upright. As such, there may be little to no gap between the outer surface of the weights and the inner surfaces of the troughs when the weights are disposed upright within the troughs. Any appropriate number of troughs may be used. For example, a single trough to receive a single dumbbell may be incorporated into the cradle. In other examples, three or more troughs are defined in the cradle.

The cradle may include an input mechanism, which may allow the user to provide an input that causes the weight connections of the first dumbbell and/or second dumbbell to change. In some cases, these changes occur simultaneously. In other cases, the changes may occur at different moments in time but still in response to the input from the single input mechanism. Any appropriate input mechanism may be used in accordance with the principles described in the present disclosure. For example, the input mechanism may include a touch screen, a key pad, a button, a lever, a switch, a slider, a microphone, a sensor, a rotary dial, another type of input mechanism, or combinations thereof. In alternative examples, the input mechanism may include a wireless mechanism, such as a transceiver, that is capable of receiving a message from a remote source. For example, the wireless mechanism may be capable of receiving instructions from a computing device to operate a selector of the dumbbell assembly in this manner that adjusts the connections between the weights and the support structures of the first and second dumbbells.

In some examples, the transceiver is connected to a mobile device that includes a touch screen that allows a user to select a desirable amount of weight for each of the first and second dumbbells. In this example, the touch screen includes a first button set that corresponds to the dumbbell and a second button set that corresponds to the second dumbbell. In some examples, a single button set is used to select the same amount of weight for each dumbbell at the same time. In some examples, the selectors that cause the appropriate amount of weight to be connected or disconnected to the dumbbells is capable of causing only a single amount of weight to be connected to both of the dumbbells at the same time. In other examples, the selectors are capable of independently adjusting the amount of weight for each dumbbell without affecting the amount of weight connected to the other dumbbell. The mobile devices may use any appropriate type of user interface for communicating the amount of weight to adjust. For example, the mobile device may include levers, rotary dials, joy sticks, scroll buttons, other types of mechanism, or combinations thereof to send instructions for adjusting the weight amount.

In other examples, a cloud based device located in a remote location from the dumbbell assembly is capable of communicating with the dumbbell assembly. The cloud based device may be a device used to run a website that allows the user to input personal information, create a user profile, input exercise routines and performance, input nutritional information, input goals, input other types of information, or combinations thereof. This cloud based device may be part of a local area network, a data center, the internet, a private based network, a wide area network, another type of network, or combinations thereof. This device may be capable of determining future workouts for the user. The user may input into the remote device through a local user interface the types of exercise programs that the user desires. Based on the user's past performance, user profile, and/or user goals, the remote device may determine for the user the amount of weight for each dumbbell. This remote device may send messages to the dumbbell assembly to adjust the weight. In some examples, the remote device additionally sends instructions to the user for the types of exercises to perform. For example, the remote device may instruct the user to perform a particular type of lift, instruct the user on the particular number of sets and repetitions to perform for each lift, the amount of time to rest between lifts, other types of information, or combinations thereof.

In some examples, the user may wear a heart rate monitor or another type of physiological parameter sensor that sends data to the input mechanism which sends the information to the remote device. In other examples, this physiological information is sent directly to the remote device. In examples where the remote device receives at least near real time physiological information about the user, the remote device can alter the workout instructions to the user and/or the amount of weight loaded to the dumbbells. The near real time physiological information about the user may include information about the user's heart rate, blood pressure, oxygen saturation, calories burned, exercise movement speed, temperature, muscle contraction, other types of muscle activity, other types of physiological parameters, or combinations thereof.

The cradle may include selectors that are incorporated into the troughs of the cradle. These selectors may be spaced within the cradle so that each of the selectors correspond to each weight of the dumbbell's weight set. As the dumbbells are received in the troughs, the selectors protrude into the cavities of the weights from the cradle opening. The linear position of the selectors is adjustable and is controlled based on the user input through the input mechanism. The linear position of the selectors also determines whether the weight associated with the selector is connected to the dumbbell or released from the dumbbell.

The input mechanism may be in communication with processing resources that are capable of sending instructions to the selectors. The selector may include a rod that includes a first linear position and a second linear position. A linear actuator may be directly or indirectly in communication with the input mechanism and may cause the rod to be in the first linear position or the second linear position. In the first linear position, a distal end of the selector engages the connection features causing the connection features to disconnect the weight from the support structure. The shape of the distal end includes at least one ramp positioned to move the hooks from the interlocking position to the release position.

In the second linear position of the selector, the distal end moves away from the connection features. In this situation, the distal end may not inhibit the connection features from moving. The connection features may be spring loaded or otherwise urged into the interlocking position when no opposing force is applied to put the connection features into the release position. Thus, as the distal end moves out of the way, the connection features move back into the interlocking position.

When the first and second dumbbells are docked in the cradle, the selector can disconnect the corresponding weights by moving the rod into the first linear position. For those weights that are to remain connected to the first and second dumbbells, the rods are positioned so that the rods do not cause the connection features to release the weights. Alternatively, the rods may move to release the weights and reconnect them.

What is claimed is:

1. A dumbbell assembly, comprising:
   an adjustable dumbbell, the adjustable dumbbell including a support structure, a handle of the support structure, and a weight is selectively connected to the support structure;
   a cradle distinct from the adjustable dumbbell, the cradle comprising:
      a trough defined in the cradle and sized to receive a weight of the adjustable dumbbell;
      an input mechanism incorporated into the cradle;
      a selection mechanism incorporated into the cradle; the selection mechanism comprising:
         a selector positioned parallel to the weight when the weight is received by the trough;
         the selector adjusting a connection of the weight with the adjustable dumbbell in response to a command received from the input mechanism;
   the weight including an underside, a cradle opening defined in the underside, and a cavity within the weight and in communication with the cradle opening;
   wherein the selector protrudes into the cavity when the weight is received by the trough; and
   a linear actuator configured to change a distance that the selector protrudes into the cavity;
   wherein when the weight is connected to the support structure, the weight moves with the handle independent of the cradle when a user picks up the dumbbell assembly; and
   wherein when the weight is disconnected from the support structure, the weight remains stationary with the cradle and does not move with the support structure when the user picks up the dumbbell assembly.

2. The dumbbell assembly of claim 1, wherein the adjustable dumbbell comprises a connection feature incorporated into the support structure; and
   the selector comprises a first linear position;
   wherein a distal end of the selector engages with a hook of the connection feature disconnecting the weight from the support structure of the adjustable dumbbell when the selector is in the first linear position.

3. The dumbbell assembly of claim 2, wherein the distal end of the selector is shaped to move the connection feature when the selector is engaged with the connection feature.

4. The dumbbell assembly of claim 1, wherein the cavity comprises a structure opening that is positioned to receive a connection feature of the support structure.

5. The dumbbell assembly of claim 4, wherein the cavity comprises a neck proximate the structure opening that comprises a catch positioned to interlock with the connection feature.

6. The dumbbell assembly of claim 1, wherein the adjustable dumbbell comprises an underside and a connection feature incorporated into the underside.

7. The dumbbell assembly of claim 6, wherein the weight comprises a cavity;
   wherein the connection feature is exposed within the cavity when the weight is received within the trough.

8. The dumbbell assembly of claim 7, wherein the connection feature comprises a hook that locks the weight to the support structure of the adjustable dumbbell when the hook is in an interlocking position.

9. The dumbbell assembly of claim 8, wherein the connection feature is positioned to release the weight from the support structure when at least a portion of the connection feature is moved in a release direction to a release position by the selector incorporated in the cradle.

10. A cradle, comprising:
a trough defined in the cradle and sized to receive at least one weight of an adjustable dumbbell and house at least one weight when disengaged from a support structure of the adjustable dumbbell;
a selection mechanism incorporated into the cradle;
an input mechanism in communication with the selection mechanism; and
the selection mechanism comprising a selector arranged to adjust a connection of the weight; and
a cavity defined in the weight;
wherein when the at least one weight is connected to the support structure, the at least one weight moves with a handle of the adjustable dumbbell independent of the cradle when a user picks up the adjustable dumbbell; and
wherein when the at least one weight is disconnected from the support structure, the weight remains stationary with the cradle and does not move with the support structure when the user picks up the adjustable dumbbell.

11. The cradle of claim 10, wherein the adjustable dumbbell comprises a connection feature; and
the selector comprises a first linear position;
wherein the selector causes a distal end of the selector to engage the connection feature disconnecting the weight from the support structure of the adjustable dumbbell when the selector is in the first linear position.

12. The cradle of claim 11, wherein the distal end of the selector is shaped to move the connection feature when the selector is engaged with the connection feature.

13. The cradle of claim 11, further comprising:
a second trough configured to receive a second weight connected to a second adjustable dumbbell; and
a second selector arranged to adjust a second connection of the second weight.

14. A weight for attachment to a support structure of an adjustable dumbbell, comprising:
a cavity in the weight for receiving a selector of a cradle that is capable of connecting or disconnecting the weight to the adjustable dumbbell;
a cradle side that resides in a trough of a cradle when the weight is received into the trough; and
a connection side, opposite the cradle side, the connection side connecting to the support structure of the adjustable dumbbell; and
a cavity defined in the weight;
wherein the selector comprises a rod that protrudes into the cavity when the adjustable dumbbell is docked in the cradle and a linear actuator that changes a distance that the selector protrudes into the cavity in response to a command from an input mechanism;
wherein when the weight is connected to the support structure, the weight moves with the adjustable dumbbell independent of the cradle when a user picks up the adjustable dumbbell; and
wherein when the weight is disconnected from the support structure, the weight remains stationary with the cradle and does not move with the adjustable dumbbell when the user picks up the adjustable dumbbell.

15. The weight of claim 14, further comprising
the connection side comprising a slot shaped to receive the support structure;
the cavity extending from a structure opening defined in a base of the slot and a cradle opening defined in the cradle side.

16. The weight of claim 15, wherein the cavity comprises a neck proximate the structure opening;
the cavity further comprising a catch positioned to interlock with a connection feature of the support structure.

* * * * *